United States Patent Office 2,816,944
Patented Dec. 17, 1957

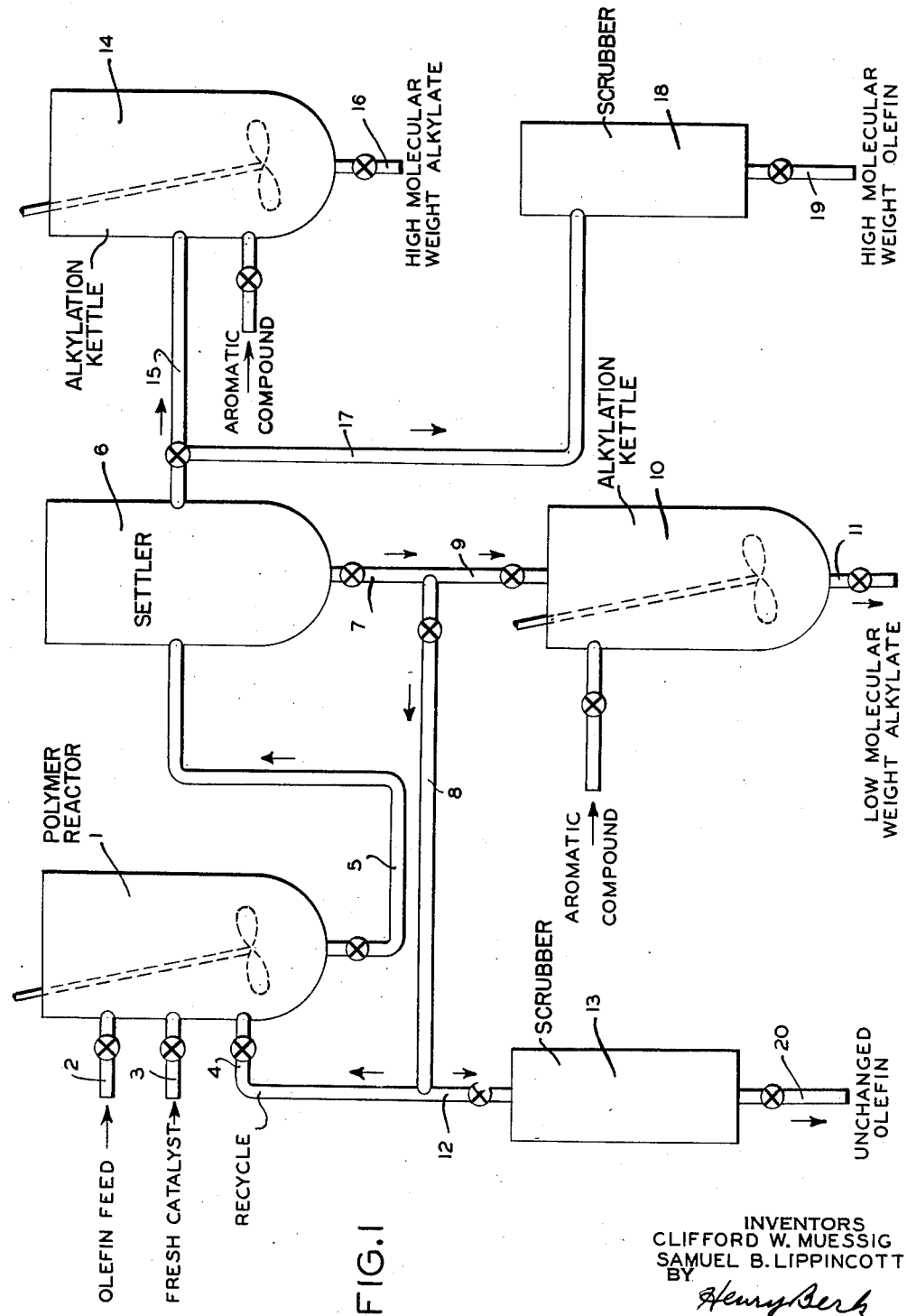

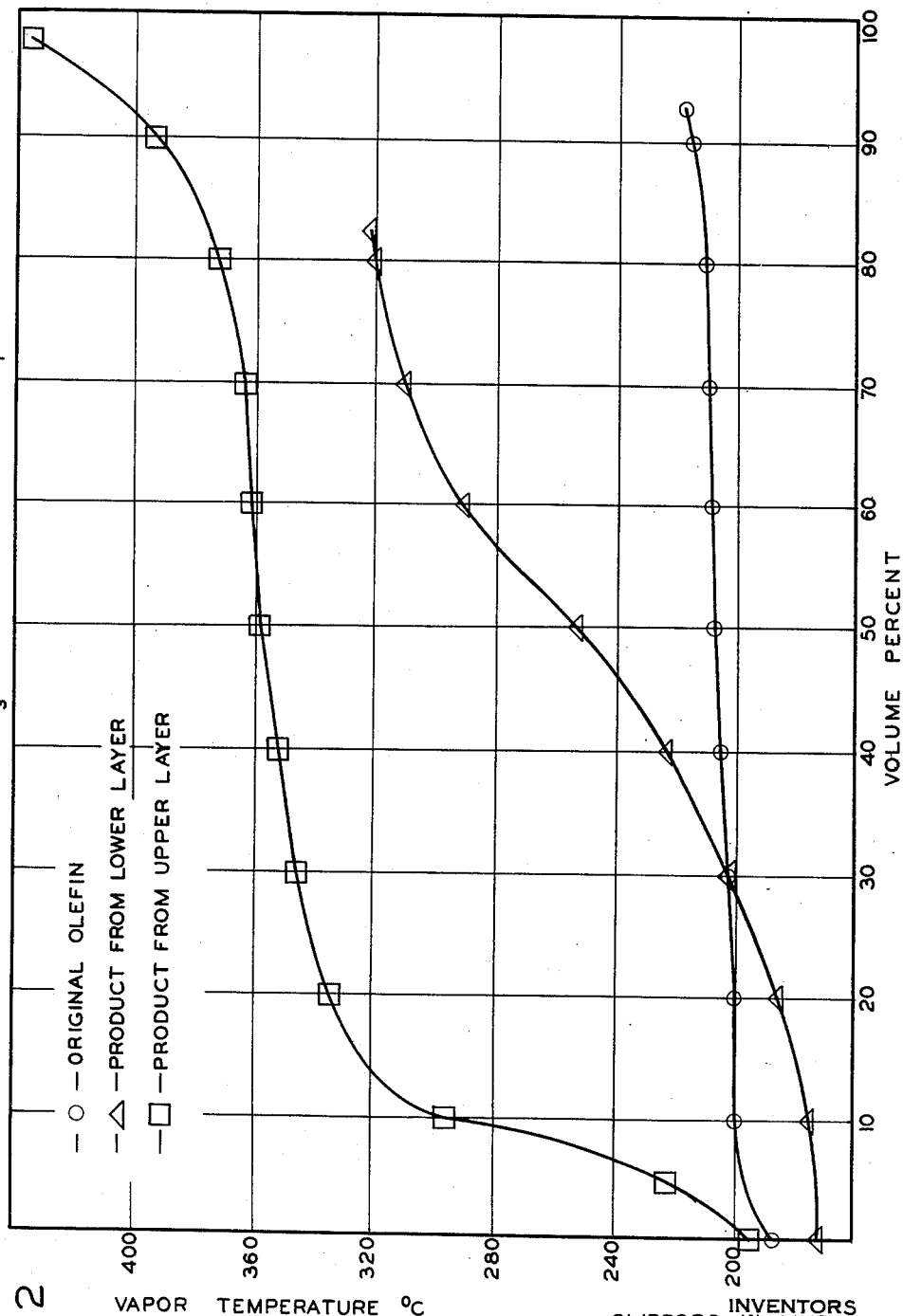

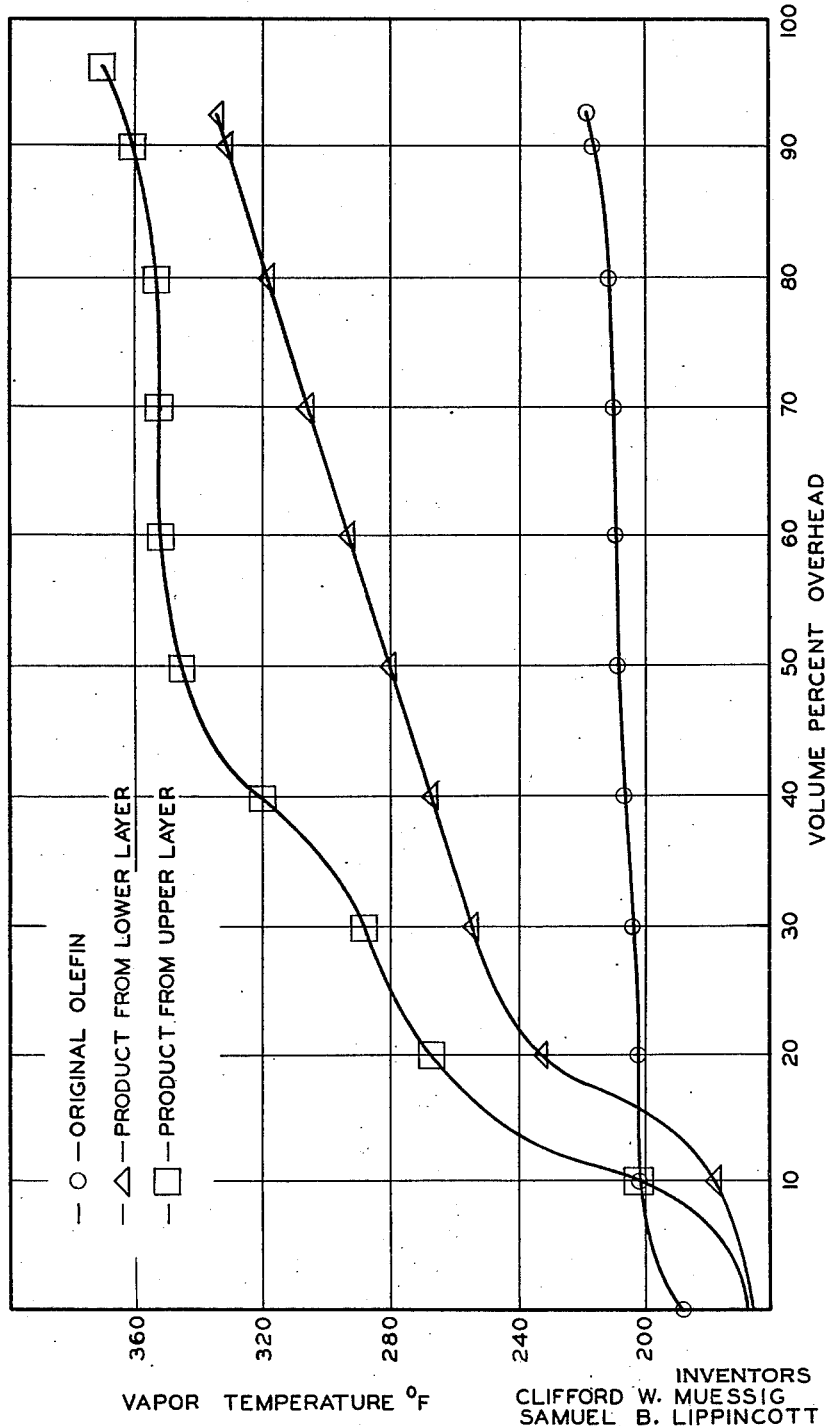

2,816,944

POLYMERIZATION OF LIQUID OLEFINS IN THE PRESENCE OF A BORON FLUORIDE-PHOSPHORIC ACID CATALYST

Clifford W. Muessig, Breton Woods, and Samuel B. Lippincott, Springfield, N. J., assignors to Esso Research and Engineering Company, a corporation of Delaware Application May 14, 1954, Serial No. 429,904

6 Claims. (Cl. 260—683.15)

The present invention relates to the polymerization of olefins, and particularly those of relatively moderately high molecular weight, such as are obtained by the cracking of wax or by polymerization of low molecular weight olefins. More particularly, the present invention relates to the preparation of olefinic polymers ranging in carbon content from $C_{12}$ to $C_{50}$, from olefinic fractions having 6 to 25 carbon atoms. Still more particularly, the present invention relates to a novel and highly advantageous method of separating and recovering the high molecular weight olefinic dimer or polymer from unreacted lower molecular weight olefinic starting material.

The olefinic hydrocarbons prepared in accordance with the present invention are particularly useful as alkylating agents to form alkylaromatic hydrocarbon intermediates in the manufacture of the corresponding sulfonic acid and sulfonate derivatives thereof possessing particularly valuable properties as detergents and as emulsifiers, especially the oil-soluble type.

In the practice of this invention, the reactant olefin which may be an olefin having from 6–25 carbon atoms and particularly one having 12 or more carbon atoms, is contacted with a catalyst composition comprising a coordination complex of boron trifluoride and phosphoric acid. There are obtained not only high yields of olefins having average molecular weight higher than the feed olefin but also as a result of the method by which separation is made and which will be disclosed more fully below, the polymerizate may be recovered in a satisfactory stage of purity without the necessary of further processing, such as distillation.

In a preferred practice of this invention, a polypropylene fraction having preferably 12 or more carbon atoms either in the form of narrow boiling or individual fractions is dimerized by means of the catalyst composition described and claimed in co-pending application, Serial No. 305,515, filed August 20, 1952, for George E. Serniuk.

This catalyst may be prepared by reacting phosphoric acid and boron fluoride at a temperature below about 50° C., the $BF_3$ preferably being introduced into the acid as a gas. The olefin feed for the process which is to be dimerized is preferably, though not necessarily, prepared by polymerizing propylene and/or butylenes in the presence of an $H_3PO_4$ catalyst in a manner well known in the art, or by cracking high molecular weight paraffin wax or petrolatum. The high molecular weight olefins, particularly those having 18 and more carbon atoms find uses in the production of synthetic detergents, lubricating oil additives, alkyl mercaptans and as intermediates in the preparation of higher alkyl derivatives of aromatic phenols and the like. The above mentioned higher molecular weight olefins are particularly useful as alkylating agents in the reaction involving the use of Friedel-Crafts catalysts. Olefins which are stable under the alkylating conditions in the Friedel-Crafts reaction do not occur in nature to any considerable extent nor are they obtainable in any large volume from cracked petroleum products or even the usual polymerization processes.

Earlier attempts to dimerize the lower propylene polymers to form principally the higher dimers using a variety of catalysts such as boron trifluoride, aluminum chloride, sulfuric acid, stannic chloride, and the like, have failed for a number of reasons, specifically, either on the basis of the poor selective conversions and low yields of the desired dimers obtained or on the nature of the associated undesired products that have to be isolated after the reaction. In the case of aluminum chloride, for example, considerable cyclization takes place during polymerization, and the resulting high molecular weight products show a reduced bromine number for a given molecular weight and are particularly unstable when subjected to further chemical reaction. When boron trifluoride alone is used as a catalyst, some dimerization is obtained but at the same time various trimers, tetramers, etc., are formed, thus making the yields of a desired dimer so poor as to be economically unattractive. In this connection, it should be noted that this invention should be differentiated from those processes which start with the simple olefin per se, such as propylene alone or in admixture with varying proportions of butylene and the simple olefin is polymerized to a mixture of $C_6$ to $C_{12}$ olefins using either phosphoric acid on kieselguhr or boron trifluoride promoted with various agents. With the above catalytic agents, fractionation of the oily products yields a large proportion of material boiling in the $C_6$ and $C_9$ ranges but the yield of material boiling in the range of 180° C. and above ($C_{12}$ and higher olefin), is a maximum of about 10% on the total stabilized material, i. e., after removal of unreacted propylene. The method of the present invention is definitely distinguished from processes in which substantial amounts of olefins or paraffins containing less than 6 carbon atoms per molecule act as polymerizing reactants.

Thus, summarizing, it has in the past been a difficult matter to obtain good yields of these high molecular weight olefins from low molecular weight olefinic starting materials. Though propylenes and butylenes polymerized readily with themselves or co-polymerized with one another to form a series of polymers, particularly in the presence of such acid catalysts as phosphoric acid, the bulk of the polymerizate boils in the $C_6$–$C_{12}$ range, and only small yields of olefins having more than 15–16 carbon atoms are ever obtained. Other polymerization catalysts, such as $AlCl_3$, tend to give high yields of paraffinic hydrocarbons. Similarly, in the cracking of wax, only relatively small amounts of olefins above $C_{10}$ are obtained.

An important problem involved in prior art operation is that of separating unreacted lower molecular weight olefins and polymers employed as feed from the higher molecular weight polymer product. In the past, costly distillation methods were employed, materially adding to the cost of the operation. Such processes also frequently resulted in loss of polymer yield due to disproportionation and degradation.

It is, therefore, an object of the present invention to describe a process for obtaining in good yields relatively high molecular weight olefins from lower molecular weight olefins.

It is also an object of the present invention to set forth a process of separating and recovering product polymer olefin from unreacted and lower molecular weight olefins without the necessity of resorting to expensive and cumbersome distillation and extraction equipment.

Other objects and advantages of the present invention will appear more clearly hereinafter.

It has now been found that when relatively high molecular weight olefins, starting with $C_6$ but particularly noticeably starting with $C_{12}$ olefins, are dimerized in the presence of an $H_3PO_4$—$BF_3$ complex catalyst, not only is there obtained high selectivity to the dimer but also a separation occurs wherein the high molecular weight polymer selectively is found in the upper layer, and the lower molecular weight olefin which may be either unreacted or partially reacted olefin, is found dissolved in the lower or acid layer. The upper layer is thus available for immediate employment in alkylation processes without the necessity for distillation or purification. The olefin polymerization itself may be carried out under a rather wide variety of reaction conditions. Reaction temperatures may range from room temperature up to as high as 300° F. and preferably from 70 to 200° F. The reaction may be conveniently carried out at atmospheric pressures although super-atmospheric pressure may be employed if desired.

In accordance with the present invention, the reaction products and reactants, after reaction, are allowed to settle. The upper oil layer is found to consist essentially of the high polymer. Unreacted olefins, on the other hand, remain in the acid layer. There is thus afforded a ready means of separating by decantation the high molecular weight olefins having approximately $2n$ carbon atoms, where $n$ is the number of carbon atoms in the original olefin, from the lower olefins fed to the polymerization zone and the olefin product thus separated may be employed directly without purification for alkylation of aromatics to prepare detergent raw material.

The dimerized polymers have higher chemical and thermal stability than iso-olefin polymers of corresponding molecular weight range made by less selective polymerizations of simple olefins. They also respond differently to treatments with chemical reagents with resulting advantages over the iso-olefin polymers in making various products, such as in preparing wetting agents by sulfonation, in alkylation of aromatic hydrocarbons or phenolic compounds, copolymerization, etc. Considerable promise has been shown for utilization of these polymers in the synthesis of fuel ingredients, lubricating oil additives, detergents, modified resins, plasticizers, cable oils, and other compositions.

The desired dimer products obtained from the controlled polymerization of propylene are indicated to be linear polymers having the basic structural skeleton

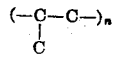

with a random distribution of the double bond, usually in a tertiary position. The methyl ethylene group enclosed by the brackets represents the recurring structural unit and $n$ is the number of units combined.

A preferred embodiment of the present invention is shown in Fig. 1, which represents one method of carrying out the polymerization and dimer recovery.

Turning now to the accompanying drawing which comprises views in elevation of suitable apparatus for carrying out the process of the invention, olefinic feed, catalyst and recycle are fed into the stirred reactor 1 through pipes 2, 3 and 4.

The ratio of olefin to catalyst is in the range of 5/1 to 30/1, preferably 10/1 to 20/1. A reaction temperature of 40–120° C., preferably 60°–70° C. is maintained for a reaction time of 0.25–3 hours, preferably 1–2 hours.

The contents of the reactor are then transferred through pipe 5 to settler 6 where the heavier catalyst containing phase settles to the bottom. This is drawn off through pipe 7 and may be recycled to reactor 1 through pipe 8, or may be utilized in another reaction that it catalyzed by similar catalysts, such as the alkylation reaction, by transferring through pipe 9 to an alkylation kettle 10, to which an aromatic compound is added. Little or no additional catalyst is needed for this alkylation since the phosphoric acid-boron trifluoride complex is also an alkylation catalyst.

The low molecular weight alkylate may be removed through a pipe 11, and may be worked up by any of the various processes known to the art. If preferred, the lower layer from settler 6 may be withdrawn through pipe 12 to scrubber 13, where it is scrubbed with water and the unchanged olefins are recovered through pipe 20.

The upper layer from settler 6 is withdrawn to alkylation kettle 14 through pipe 15 where it is mixed with an aromatic compound introduced through pipe 16. Little or no additional catalyst is needed for the alkylation step since the product from settler 6 is saturated with $BF_3$ which is also an alkylation catalyst. The high molecular weight alkylate may be removed through pipe 16 and may be worked up by any of the various processes known to the art. If the high molecular weight olefin is wanted for purposes other than alkylation of an aromatic compound it may be removed from settler 6 through pipe 17 to scrubber 18 where it is scrubbed free of catalyst and may be withdrawn through pipe 19 and refined by any of the various processes known to the art.

The apparatus of the accompanying drawing may readily be modified to allow the various steps of the process to be carried out in a continuous manner.

The process of the invention may be further illustrated by the following examples, demonstrating the utility and advantages of the invention.

EXAMPLE 1.—PREPARATION OF CATALYST

A. *Preparation of 100% phosphoric acid*

The phosphoric acid for the preparation of the catalyst was obtained by adding phosphoric pentoxide to syrupy phosphoric acid (85% $H_3PO_4$) at the rate of 39.5 g. to 100 g., with stirring in a three-necked flask fitted with a mechanical stirrer, reflux condenser, calcium chloride tube and heating mantle. After the required amount of phosphoric pentoxide had been added, the mixture was stirred and heated at about 80° C. for four hours to yield 100 percent phosphoric acid.

B. *Preparation of the* $H_3PO_4 \cdot BF_3$ *complex*

The 100 percent phosphoric acid prepared above was treated with boron trifluoride gas while maintaining a temperature at or below room temperature (20° C.) until about one mole of boron trifluoride per mole of phosphoric acid had been absorbed. The complex was then completely saturated at room temperature. The gain in weight indicated slightly more than one mole of boron trifluoride per mole of phosphoric acid.

EXAMPLE 2.—POLYMERIZATION OF TRIPROPYLENE

Tripropylene is a commercially available olefin produced by the polymerization of propylene or propylene containing minor amounts of butylenes. Tripropylene (1330 ml.) and 100 ml. of the $H_3PO_4 \cdot BF_3$ complex of Example 1 were stirred together in a flask while a slow stream of $BF_3$ gas bubbled through the mixture. The temperature rose spontaneously to about 70° C. and was maintained at 60–70° C. for one hour. After cooling and settling, the layers were separated by decantation. Each layer was washed with water several times and then was dried with calcium chloride. The upper layer yielded 1105 ml. of washed and dried product, the lower layer 134 ml. Each was distilled at reduced pressure. Vapor temperatures were corrected to atmospheric pressure by the chart of Lippincott and Lyman (Ind. Eng. Chem. 38, 320) and distillation curves were plotted.

Bromine numbers were obtained as follows:

Bromine number of original olefin _____ 143
Bromine number of product from upper layer _____ 64

Distillation data show that the tripropylene was converted to olefins having a molecular weight of somewhat more than twice the molecular weight of the original and that the unchanged tripropylene was concentrated to a large extent in the lower or catalyst layer.

EXAMPLE 3.—POLYMERIZATION OF $C_{10}$-$C_{11}$ OLEFIN

In the commercial polymerization of propylene the products are largely dipropylene, tripropylene, and tetrapropylene. However, there is always produced some products boiling between these and this is true especially if the feed to the polymerization unit contains substantial quantities of the butylenes. The $C_{10}$-$C_{11}$ fraction from such a commercial polymerization of a mixed propylene-butylene feed stock was subjected to further polymerization as described in Example 2, except that the reaction time was increased to three hours. From 1330 ml. of the original olefin there was obtained 1140 ml. of oil from the upper layer of the reaction mixture and 63 ml. of oil from the lower layer. Bromine numbers were obtained as follows:

Bromine number of the original olefin _____ 105
Bromine number of product from upper layer:
    Distilling at 290–310° C. _____ 51
    Distilling at 310–410° C. _____ 39

Distillation data show that the conversion no higher boiling olefins was virtually complete. Some selectivity in the extraction of low boiling olefins by the catalyst phase is indicated by the distillation curves, although due to the high conversion there was little to extract.

EXAMPLE 4.—POLYMERIZATION OF TETRAPROPYLENE

A sample of tetrapropylene was obtained from a commercial operation when the feed to the plant was virtually pure propylene. This was further polymerized as described in Example 2, above, the reaction time being increased to 1½ hours. From 1330 ml. of tetrapropylene there was obtained 1045 ml. of oil from the upper layer and 110 ml. of oil from the lower layer. Distillation curves for these products are shown in Figure 2. The following bromine numbers were obtained:

Bromine number of the original olefin _____ 94
Bromine number of product from upper layer, distilling at 340–380° C. _____ 63

These data show a high conversion to higher boiling olefins and selective extraction of low boiling products from high boiling products by the lower or catalyst phase of the reaction mixture.

EXAMPLE 5.—POLYMERIZATION OF TETRAPROPYLENE

Example 4 was repeated except that $BF_3$ gas was not bubbled through the reaction mixture during the reaction. From 1330 ml. of tetrapropylene there was obtained 830 ml. of oil from the upper layer and 420 ml. of oil from the lower layer. Distillation curves for these products are shown in Figure 3. Bromine numbers are shown below:

Bromine number of the original olefin _____ 94
Bromine number of the product from the upper layer:
    Distilling at 170–340° C. _____ 78
    Distilling at 340–365° C. _____ 51

These data show somewhat lower conversion to higher molecular weight olefins and somewhat poorer selectivity of extraction of lower molecular weight materials when $BF_3$ is not bubbled through the reaction mixture. Nevertheless, the process is still operable and in certain cases might be preferable.

EXAMPLE 6.—POLYMERIZATION OF PENTAPROPYLENE

The olefin used in this example was considered to be pentapropylene although it contained all of the product boiling above tetrapropylene obtained in the commercial polymerization of propylene.

One liter of pentapropylene and 50 ml. of the $H_3PO_4.BF_3$ complex of Example 1 were stirred while $BF_3$ gas was bubbled through the mixture. The temperature rose spontaneously to 80° C. and was thereafter maintained at 70–75° C. for three hours. The reaction mixture was allowed to cool to room temperature and the layers were separated and treated as described in Example 2. In this way, there were obtained 615 ml. of oil from the upper phase and 200 ml. of oil from the lower phase. Distillation data indicated about 60% conversion to higher boiling products and a very good separation of the unreacted olefin from the high molecular weight olefin by extraction into the catalyst phase.

The product from the upper phase was fractionated into three fractions and data obtained on each fraction as follows:

| Cut points, °C.[1] | 180–305 | 305–405 | 405–505 |
|---|---|---|---|
| Size of cut, vol. percent | 18 | 47 | 31 |
| Molecular weight | 185 | 255 | 389 |
| Bromine number, cg. Br/g | 86 | 63 | 40 |
| Theoretical bromine number based on molecular weight | 87 | 63 | 41 |

[1] Distillation at reduced pressure, boiling points corrected to 760 mm.

EXAMPLE 7.—POLYMERIZATION OF $C_{20}$ OLEFIN

The 340–380° C. cut of the product from the upper layer of Example 4 (355 ml.) was further polymerized by stirring with 40 ml. of $H_3PO_4.BF_3$ complex in the presence of extraneous $BF_3$ gas. The temperature rose spontaneously to 65° C. and was maintained at this temperature for one hour. The reaction mixture was worked up as described in Example 2, thus obtaining 240 ml. of oil from the upper layer and 73 ml. from the lower layer. Distillation curves for these products show a good conversion to higher molecular weight products and good separation of the unreacted olefin from the product by extraction into the catalyst phase. Bromine numbers were obtained as follows:

Bromine number of the original _____ 63
Bromine number of product from upper phase, distilling at 400–520° C. _____ 18

EXAMPLE 8.—*Polymerization of decene from cracked wax*

A sample of thermally cracked scale wax was fractionated and the $C_{10}$ fraction (1330 ml.) was treated with 100 ml. of $H_3PO_4 \cdot BF_3$ complex while bubbling $BF_3$ gas through the stirred reaction mixture. The temperature rose spontaneously to 70° C. and was maintained at this temperature for one hour. The products were worked up as described in Example 2. The upper layer yielded 1165 ml. of oil while the lower layer yielded 110 ml. Bromine numbers were as follows:

Bromine number of the original olefin _____ 119
Bromine number of product from upper layer, distilling at 310–380° C. _____ 59
Bromine number of product from lower layer, distilling at 130–290° C. _____ 110

There was obtained about 70% conversion of decene to higher molecular weight olefins. The oil from the catalyst layer was largely unchanged decene.

EXAMPLE 9

Tetrapropylene (1 l., 4.5 moles) was stirred with $BF_3 \cdot H_3PO_4$ catalyst (100 ml.) at 35–50° C. for 3 hours while a slow stream of $BF_3$ gas was bubbled through the mixture. Toluene (500 cc.) was added and the reaction continued at 50–60° for another 3 hours, still bubbling $BF_3$ into mixture. The reaction mixture was washed with water and distilled. After removing the unreacted toluene distillation was continued at reduced pressure. Two fractions were collected, (1) detergent alkylate distilling at 260–340° C., 160 g., and (2) heavy alkylate distilling at 320–500° C., 572 g. Boiling points are corrected to atmospheric pressure.

The heavy alkylate was sulfonated and converted to the sodium sulfonate. A good yield of sulfonate was obtained. It was completely oil soluble.

What is claimed is:

1. The process of preparing high molecular weight liquid olefin polymers comprising the steps of contacting liquid olefins having 6 to 25 carbon atoms in a polymerization zone with a polymerization catalyst consisting essentially of a coordination complex of about one mole of boron fluoride per mole of phosphoric acid, the volumetric ratio of olefins to catalyst being in the range of 5/1 to 30/1, maintaining a temperature of about 70° to 300° F. in said polymerization zone, passing an extraneous stream of boron trifluoride through said polymerization zone, withdrawing a mixture of liquid reaction product and catalyst from said polymerization zone after a residence time of about 0.25 to 3.0 hours therein, maintaining said mixture in a settling zone whereby two separate liquid layers are formed, an upper hydrocarbon layer selectively containing the desired high molecular weight liquid olefin polymers having about twice as many carbon atoms per molecule as the olefinic feed and a lower catalyst layer containing lower molecular weight olefins, and withdrawing said upper layer from said settling zone.

2. The process of claim 1 wherein the olefin monomer is tripropylene.

3. The process of claim 1 wherein the olefin monomer is tetrapropylene.

4. The process of claim 1 wherein the olefin monomer is a $C_{10}$–$C_{11}$ olefin.

5. The process of claim 1 wherein the olefin monomer is pentapropylene.

6. The process of preparing high molecular weight liquid olefin polymers having about 24 carbon atoms per molecule comprising the steps of contacting liquid tetrapropylene in a polymerization zone in a volumetric ratio of 10/1 to 20/1 with a polymerization catalyst comprising a coordination complex of one mole of boron fluoride and one mole of 100% phosphoric acid, maintaining a temperature of 60°–70° C. in said polymerization zone, passing an extraneous stream of boron fluoride through said polymerization zone, withdrawing a mixture of liquid reaction product and catalyst from said polymerization zone after a residence time of 1 to 2 hours therein, maintaining said mixture in a settling zone whereby two separate liquid layers are formed, an upper hydrocarbon layer containing the desired liquid olefin polymers having substantially 24 carbon atoms per molecule and a lower catalyst layer relatively free of said olefin polymers but containing unconverted and partially converted olefins, and withdrawing said upper layer from said settling zone.

References Cited in the file of this patent

UNITED STATES PATENTS

| | | |
|---|---|---|
| 2,018,065 | Ipatieff | Oct. 22, 1935 |
| 2,171,207 | Boultbee | Aug. 29, 1939 |
| 2,228,669 | McAllister | Jan. 14, 1941 |
| 2,320,256 | Bailey et al. | May 25, 1943 |
| 2,380,234 | Hall | July 10, 1945 |
| 2,412,595 | Axe | Dec. 17, 1946 |
| 2,477,382 | Lewis | July 26, 1949 |
| 2,622,113 | Hervert | Dec. 16, 1952 |